Nov. 25, 1969 G. E. SMITH 3,480,801
UNIJUNCTION TRANSISTOR TIMING CIRCUIT
Filed Sept. 27, 1965
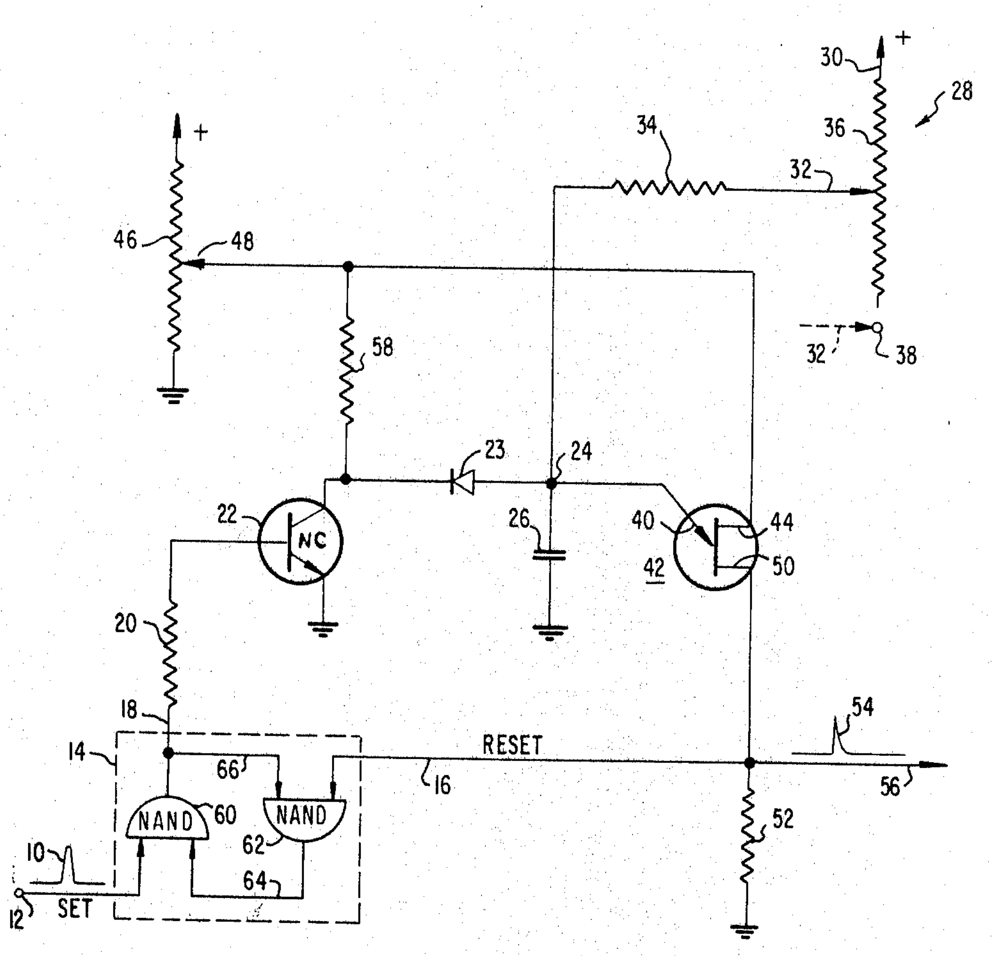
INVENTOR
GEORGE E. SMITH
BY Aughue, Rothwell, Mion, Zinn & Macpeak
ATTORNEYS United States Patent Office 3,480,801 Patented Nov. 25, 1969

3,480,801

UNIJUNCTION TRANSISTOR TIMING CIRCUIT

George E. Smith, Bridgeton, Mo., assignor to Monsanto Company, St. Louis, Mo., a corporation of Delaware Filed Sept. 27, 1965, Ser. No. 490,227
Int. Cl. H03k *17/26, 17/28, 3/26*
U.S. Cl. 307—293 2 Claims

ABSTRACT OF THE DISCLOSURE

A unijunction transistor timing or pulse delay circuit including a unijunction transistor which is fired by the voltage on a timing capacitor to discharge the capacitor and to produce an output pulse at a controllable time interval after the application of a start pulse to the circuit. The time interval is controllable over a wide range from a fraction of a second to many seconds, including a sudden transition to an infinite time delay, by means of a rheostat which is connected in the capacitor timing circuit and which is open-circuited at one end.

This invention relates generally to a unijunction transistor timing circuit and more particularly to a unijunction transistor timing circuit having a timing cycle which is variable over a wide range.

The principal object of this invention is to provide an improved timing circuit including a semiconductor switching device.

Another object of this invention is to provide a unijunction transistor timing circuit having a timing cycle which is variable over a wide range from a fraction of a second to many seconds.

A more specific object of this invention is to provide a unijunction transistor timing circuit having means to control the timing cycle over a wide range including a sudden transition to an infinite time delay.

Another specific object of this invention is to provide a unijunction transistor timing circuit which is responsive to a plurality of input pulses of the same polarity to provide like polarity output pulses delayed with respect to the input pulses by a time interval which may be varied.

Other objects and advantages of this invention will become apparent from the following description of a preferred embodiment thereof which is also illustrated as a schematic circuit diagram in the attached drawing.

In this preferred embodiment of the timing circuit, a positive start pulse 10 is applied to the SET input lead 12 of a flip-flop circuit 14 which also has a RESET lead 16. Flip-flop 14 functions to provide a positive potential on its output lead 18 when it is in the SET condition and a zero or negative potential when it is in its RESET condition.

Output lead 18 of flip-flop 14 is connected through a resistor 20 to the base of a normally conducting NPN transistor 22 whose emitter is grounded and whose collector is connected through a silicon diode 23 to a junction point 24. A timing capacitor 26 is connected between point 24 and ground.

In addition, a linear rheostat 28 is connected between point 24 and a source of positive potential connected to a lead 30. Rheostat 28 includes a wiper arm 32 connected through a resistor 34 to a point 24, and also a fixed resistor 36 having its upper end connected to lead 30. The lower end of resistor 36 is open-circuited as shown by the open-circuited terminal 38.

Also connected to point 24 is the emitter 40 of a unijunction transistor 42 whose upper base 44 is connected to a suitable positive potential through a potentiometer 46 having an adjustable wiper arm 48. The lower base 50 of unijunction transistor 42 is connected to ground through an output resistor 52. A positive output timing pulse 54 is developed between ground and an output lead 56 connected to the upper end of resistor 52. Output lead 56 is also connected to the RESET lead 16 of flip-flop 14.

A resistor 58 is connected between wiper arm 48 and the collector of transistor 22.

Flip-flop 14 is illustrated as comprising a pair of two-input NAND gates 60 and 62. The timing circuit input lead 12 is connected to one input of gate 60, and the output of gate 62 is connected via a lead 64 to the other input of gate 60. The output of gate 60 is connected by a lead 66 to one input of gate 62, and RESET lead 16 is connected to the other input of gate 62.

In the normal or quiescent condition of the timing circuit, transistor 22 is saturated and current flows between the positive source connected to lead 30, through rheostat 28, resistor 34, diode 23 and the collector-emitter circuit of transistor 22 to ground. Consequently, current is shunted around timing capacitor 26. Furthermore, in the quiescent condition, there is no input applied to input lead 12 and there is zero potential on output lead 56 and also on RESET lead 16 of flip-flop 14. Under such conditions lead 18 carries a positive potential, thereby biasing the NPN transistor 22 into conduction.

Let us now look more closely at the operation of flip-flop 14. In the normal condition, the output of NAND gate 60 is positive, and therefore, a positive potential is applied via lead 66 to one input of NAND gate 62. However, the other input of gate 62 is at zero or ground potential and consequently, the output of gate 62 and lead 64 is zero. Therefore, to complete the loop, it is seen that both inputs of gate 60 are zero and, therefore, the output is positive to maintain flip-flop 14 and transistor 22 in their normal conditions.

However, upon the application of a positive start pulse 10, input lead 12 of gate 60 becomes positive, thereby lowering the output of gate 60 to cut off transistor 22. In addition, the potential on lead 66 is now also lowered, and the output of gate 62 becomes positive to maintain the output of gate 60 at zero potential to keep transistor 22 in its non-conducting state, while start pulse 10 is present. Even when pulse 10 has disappeared, the logic of gate 60 keeps its output at zero.

It should be obvious that each of the NAND gates 60 and 62 functions in such a way that when both inputs are positive, or when the inputs are different, the output is zero, and when, and only when, both inputs are zero, is the output positive.

When transistor 22 is cut off, capacitor 26 begins to charge to the positive potential connected to lead 30. The rate of charging is determined by the RC time constant formed by the capacitor 26 and the combined resistance of resistor 34 and the portion of resistor 36 between wiper arm 32 and lead 30.

When the voltage across capacitor 26 reaches the firing voltage of unijunction transistor 42, then capacitor 26 quickly discharges through the emitter and lower base junction of transistor 42 and output resistor 52 to ground. A very sharp positive output pulse 54 is thereby produced both on output lead 56 and also on the feedback RESET lead 16 of flip-flop 14. The positive pulse on lead 16 causes the output of gate 62 to become zero, and since by this time the start pulse 10 has disappeared, both inputs of gate 60 are now zero, thereby causing the output of gate 60 to become positive to bias transistor 22 into its normal conducting state, thereby returning the timing circuit to its normal or quiescent condition. When the output of gate 60 becomes positive, the output of gate 62 remains zero regardless of whether pulse 54 is still present on RESET lead 16.

The time delay between the start pulse 10 and output pulse 54 is determined by the setting of rheostat 28. The shortest delay between the start and output pulses occurs when wiper arm 32 engages lead 30 so that the only resistance in the RC timing circuit is resistor 34. As wiper arm 32 moves toward terminal 38, the resistance in the timing circuit increases, and thereby increases the time delay between the start and output pulses. An important feature of this invention is that wiper arm 32 may be moved to open circuited terminal 38 during a timing cycle, and thereby suddenly produce an infinite time delay between the start and output pulses. Such a result occurs because the timing capacitor then never reaches the firing voltage of the unijunction transistor 42, and therefore, no positive pulse is available on RESET lead 16 to reset flip-flop 14. Diode 23 prevents current from the positive supply connected to potentiometer 46 from charging capacitor 26 during this indefinite or infinite time delay condition of the timing circuit.

The positive potential connected to potentiometer 46 also supplies the collector bias voltage for transistor 22 and the upper base bias voltage for unijunction transistor 42. The voltage across capacitor 26 which is necessary to fire unijunction transistor 42 may be calibrated by moving wiper arm 48 along potentiometer 46. As the voltage applied to upper base 44 is decreased, the firing voltage of the unijunction transistor decreases.

Supplying both the collector of transistor 22 and unijunction transistor 22 from the same D.C. power supply via potentiometer 46 insures the proper discharge of timing capacitor 26. Silicon diode 23 functions to prevent current in wiper arm 48 from contributing to the charging current of capacitor 26 during the timing cycle. Since unijunction transistor 42 and transistor 22 are biased from the same supply and since the firing potential of the unijunction transistor is a fixed percentage (typically 75%) of the supply voltage, the relative values of the collector voltage of transistor 22 and firing voltage of unijunction transistor 42 are maintained such that diode 23 remains back-biased when potentiometer 46 is adjusted to calibrate the firing point of unijunction transistor 42. In other words, the collector voltage of transistor 22 remains more positive than the firing voltage of the unijunction transistor 42. Furthermore, diode 23 permits transistor 22 to be a relatively cheap one having a high leakage current compared to that of more expensive transistors.

This timing circuit is useful for timing sequences where a "hold" condition may be required as, for example, in the display time control of a digital voltmeter or countertimer. The circuit provides a variable time delay over a large range from a fraction of a second to many seconds and also provides for a sudden transistion to an infinite time delay.

While the invention has been particularly shown and described with reference to a preferred embodiment thereof, it will be understood by those in the art that various changes in form and details may be made therein without departing from the spirit and scope of the invention.

What is claimed is:

1. A timing circuit comprising:

(a) an input circuit having means for receiving an input signal and means for receiving a reset signal, (b) a normally conducting switching transistor connected to said input circuit, (c) a capacitor, (d) means coupling a D.C. source to said switching transistor and to said capacitor, said switching transistor preventing said D.C. source from charging said capacitor when said switching transistor is conducting, (e) a variable impedance connected between said coupling means and said capacitor for varying the time interval of said timing circuit over a wide range, said impedance including a rheostat having one end thereof open-circuited to permit adjusting said impedance to an open circuit condition, thereby making said time interval infinite, (f) a normally non-conducting unijunction transistor having its emitter connected to said capacitor, (g) a diode connected between said switching transistor and the emitter of said unijunction transistor, (h) means connected to said unijunction transistor and to said switching transistor and adapted to be connected to a supply voltage for calibrating the firing voltage of said unijunction transistor and for maintaining a constant ratio between the operating potential applied to said switching transistor and the firing voltage of said unijunction transistor, (i) an output circuit connected to said unijunction transistor, and (j) means connecting said output circuit to said input circuit, whereby an input pulse applied to said input circuit renders said switching transistor non-conducting to cause said capacitor to charge during a time interval determined by said impedance to a voltage sufficient to fire said unijunction transistor and cause said capacitor to discharge therethrough to produce in said output circuit an output pulse delayed by said time interval from said input pulse, said output pulse being fed back via said connecting means to said input circuit to return said switching transistor to its normally conducting state.

2. A timing circuit as defined in claim 1 wherein said input circuit comprises a flip-flop circuit which is set by said input pulse and reset by said output pulse.

References Cited

UNITED STATES PATENTS

| | | | |
|---|---|---|---|
| 2,949,547 | 8/1960 | Zimmermann | 307—293 |
| 3,048,708 | 8/1962 | Raver | 307—293 |
| 3,225,221 | 12/1965 | Scott | 307—293 X |
| 3,250,923 | 5/1966 | Lisca et al. | 307—293 X |
| 3,294,983 | 12/1966 | Draper | 307—293 X |

JOHN S. HEYMAN, Primary Examiner

U.S. Cl. X.R.

307—215, 273, 283